May 23, 1950 — A. L. FACCOU — 2,509,091
CONSTRUCTION SEALING BETWEEN RELATIVELY ROTATING ELEMENTS
Filed Sept. 29, 1947
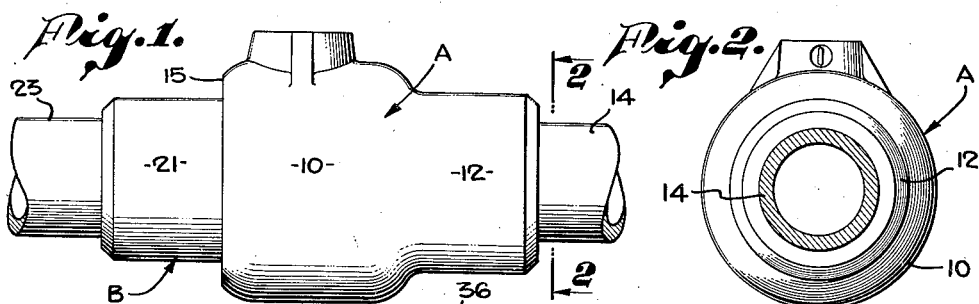
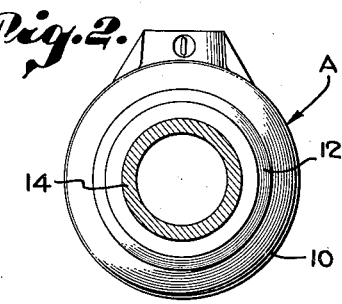
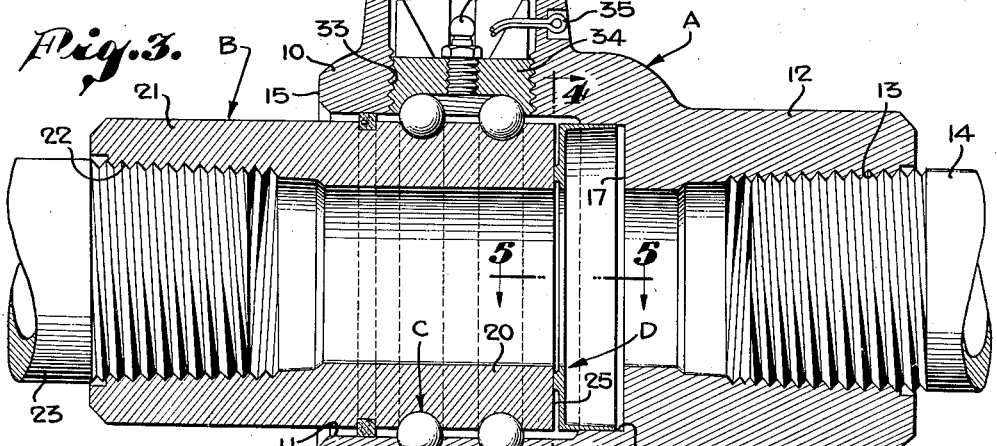
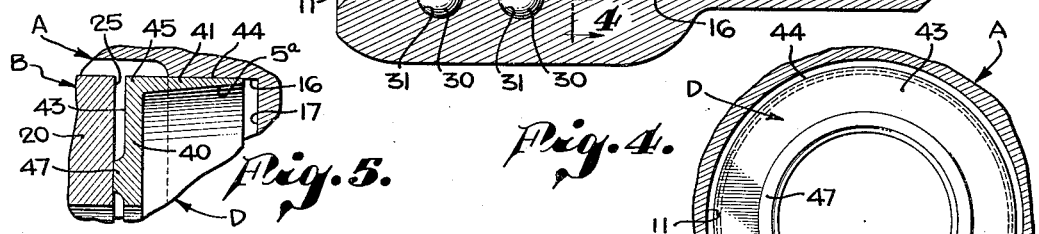
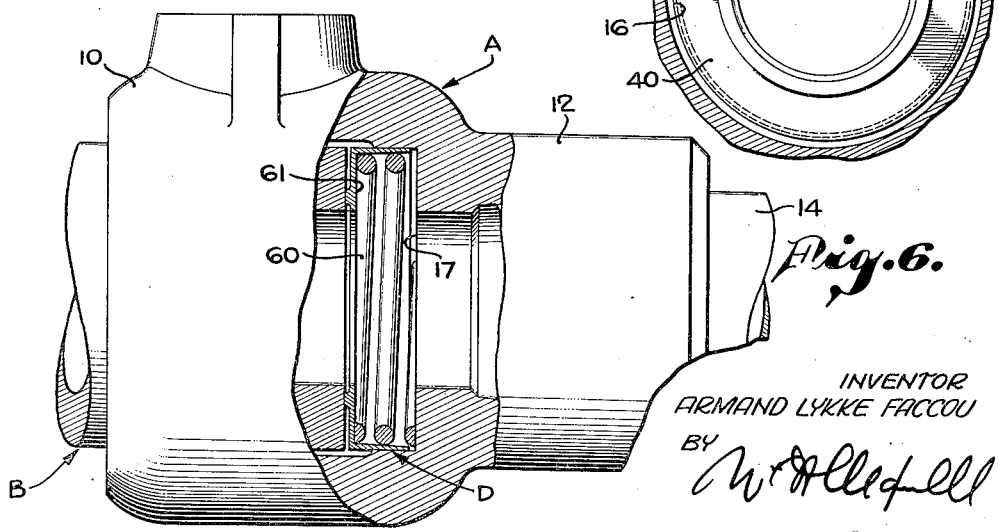
INVENTOR
ARMAND LYKKE FACCOU
BY
ATTORNEY Patented May 23, 1950

2,509,091

UNITED STATES PATENT OFFICE 2,509,091

CONSTRUCTION SEALING BETWEEN RELATIVELY ROTATING ELEMENTS

Armand Lykke Faccou, Santa Ana, Calif., assignor to Chiksan Company, Brea, Calif., a corporation of California Application September 29, 1947, Serial No. 776,680

2 Claims. (Cl. 285—97.3)

This invention has to do with a construction sealing between relatively rotating elements and it is a general object of the invention to provide a simple, practical, effective seal or sealing construction that can be used to advantage in swivel joints employed to handle fluid or the like.

There are various situations in which it is desired to pack or seal between relatively rotating elements and in some cases conditions are such that commonly recognized packing materials are not effective or do not have the desired physical characteristics. Furthermore, in many cases as in swivel connections there is or there may develop some play or shifting between the relatively rotating parts, which play or shifting is harmful to most packings or packing constructions.

It is a general object of my present invention to provide a packing construction of such character that it can be used, generally, between rotating parts where ordinary packing rings are used and which is such as to establish and maintain an effective seal between the parts under severe working conditions and over long periods of time.

It is another object of this invention to provide a construction of the general character referred to involving only metal so that it is entirely free of soft material subject to rapid wear or breakdown, or to being compressed or dead after a limited amount of use. The seal that I have provided being of metal it may be made neutral insofar as the material being handled is concerned, with the result that there is no contamination or discoloration of fluids, etc.

It is a further object of the present invention to provide a seal of the general character referred to which adjusts or accommodates itself to the parts sealed even allowing some play or working between the parts without losing or breaking the desired sealing engagement.

Another object of the present invention is to provide a seal of the general character referred to which is exceptionally simple and inexpensive of construction and application. The invention may be carried out by using one simple unitary part that is inexpensive of manufacture and which may be used to advantage in a simple form of packing chamber.

The various objects and features of my invention will be fully understood from the following detailed description of typical preferred forms and applications of the invention, throughout which description reference is made to the accompanying drawings, in which:

Fig. 1 is a side elevation of a swivel connection provided for handling fluid and involving the structure of the present invention. Fig. 2 is a view taken as indicated by line 2—2 on Fig. 1. Fig. 3 is a longitudinal detailed sectional view of the structure shown in Fig. 1, showing the application of my sealing construction incorporated therein. Fig. 4 is a transverse sectional view taken as indicated by line 4—4 on Fig. 3. Fig. 5 is an enlarged detailed sectional view of a portion of the structure, being a view taken substantially as indicated by line 5—5 on Fig. 3, and Fig. 6 is an enlarged side elevation of a modified form of the invention with certain parts broken away to illustrate details of the construction.

The packing or packing construction of the present invention can be used to advantage in various manners or in various constructions. For purpose of example I have disclosed it as applied to a more or less common type of swivel connection including relatively rotatable elements defining a packing chamber with two angularly related walls, one on one element and the other on the other element. Referring first to Figs. 1 to 5 of the drawings the structure illustrated involves, generally, an outer or body section A, an inner or core section B, anti-friction means C rotatably coupling the sections and sealing means D incorporating the present invention and applied to or combined with the sections A and B to seal between them while allowing full or free rotation between them.

The body A is shown as having a case section 10 with a socket 11 therein. The section A is provided with a coupling portion 12 which joins the inner end of the case section and which is shown in the drawings as internally threaded at 13 to receive a pipe 14 or the like. The socket or bore 11 extends into the case portion 10 from the outer end 15 to the inner end portion of the case where there is a slightly reduced counterbore 16 between the inner end of the bore 11 and the bottom 17 of the case. In accordance with my invention the seat opening 16 is concentric with the longitudinal axis of the construction and its surface is accurately or smoothly finished.

The inner or core section B may be a simple tubular part as shown in the drawings. In the case illustrated the core section B has a spindle portion 20 entering the socket or bore 11 to be retained therein by the means C. A projecting end portion 21 of the core is continuous with the spindle and is shown provided with an internal threaded opening 22 to receive a pipe 23 or the like. In accordance with my construction the inner end 25 of the core, that is, the inner end of the spindle portion 20 of the core, is a flat smooth face in a plane normal to the axis of the structure. The spindle terminates within the bore 11 and before reaching the seat opening 16 so that the end face 25 is spaced somewhat outwardly of the seat opening 16 and is spaced a substantial distance from the bottom 17 as clearly illustrated in Fig. 3 of the drawings.

The bearing or anti-friction means C rotatably couples the elements A and B and in the case illustrated it involves two annular rows or series of ball bearings 30 carried in registering grooves 31 in the case 10 and spindle 20. The ball bearings are introduced into place through a radial opening 33 in the case, which opening is normally closed by a suitable plug 34 screw threaded into the opening and retained by a suitable lock device 35. In practice a suitable lubricant is introduced to the means C through a fitting 36 carried by the plug 34.

The means D provided by this invention involves, primarily, a sealing ring which is preferably a unitary endless ring characterized by two angularly related flanges or lips. In the case illustrated where the parts to be sealed are at right angles to each other, the sealing ring has a radial lip 40 that cooperates with the radial end 25 of the core element B and it has an axial lip 41 that engages and cooperates with the seat opening 16 in the case 10. The radial lip 40 has a face 43 that is flat and has sealing or bearing engagement on the end 25 of element B. The axial lip 41 is concentric with the axis of the structure and has an outer finished side or face 44 that has sealing engagement in the opening 16.

In accordance with my invention the lips 40 and 41 are rigidly connected. In fact, they are preferably integrally joined. In the case illustrated the outer peripheral edge portion of the radial lip 40 is joined to or with one end of the axial lip 41 forming a corner 45 at which the lips are joined or connected. With this construction the inner edge portion of the radial lip 40 is free while the other end of the axial lip 41 is free and it is the free end portion of the axial lip 41 which enters or is engaged in the seat opening 16.

In the particular form of the invention illustrated a boss 47 is shown provided on the outer side of face 43 of the radial lip 40 and the sealing face is formed on the boss, the face being of limited extent radially to provide a continuous narrow or band-like sealing engagement between the lip 40 and the end of the section B, the point of engagement being remote from the corner 45 where the lip 40 connects to the lip 41. In practice it is desirable that the core engaging boss 47 of the sealing ring be limited in extent and it is desirable that it be of minimum diameter.

The outer or projecting end portion of the axial lip 41 fits into the seat opening 16 to have sealing engagement therewith and in the preferred arrangement of parts the lip 41 is only partially received in the opening 16 so that the corner portion 45 where the lips are joined is not received in the opening 16 but rather is entirely free and unsupported. In practice it is desirable to provide a light press fit between the lip 41 and the opening 16 so that the lip fits snugly into the opening and yet is free to work axially therein in a limited manner under operating conditions as will be hereinafter described. In the preferred form of the invention as illustrated in the drawings the axial lip 41 has its outer surface 44 shaped or formed to be truly cylindrical in character to accurately fit the bore or opening 16 while the inner wall 5a of the lip is somewhat pitched or tapered so that the lip varies in thickness between its ends, the large or thick end being joined to the lip 40 at corner 45 while the thin end enters the opening 16.

In carrying out the present invention the sealing ring as hereinabove described is preferably formed of metal and in practice the particular metal employed may vary with the fluid to be handled or the working conditions. It is desirable that the metal used have considerable resilience and for general use the ring may be formed of a suitable bronze whereas under special conditions it may be desired to use stainless steel or other such materials.

Under operating conditions the sealing ring is related to or engages the sections A and B, as clearly shown in Fig. 3 of the drawings, under which conditions the axial lip 41 is engaged and snugly fitted in the opening 16 while the sealing face 43 of the radial lip 40 has sealing or bearing engagement with the end 25 of the section B. Pressure on fluid handled by the structure tends to expand the lip 41 in the opening 16 maintaining a tight seating engagement of the axial lip in the opening and it tends to move the radial lip 40 toward the end of section B so that continuous sealing engagement is maintained between the radial lip and the end of section B. If the pressure is high the ring may shift bodily toward the end of section B to bring the parts into proper sealing engagement.

With the construction that I have provided the sealing ring will not only effectively seal when the sections A and B seat in proper alignment so that there is no working or shifting between them as rotation occurs, but it will also maintain sealing engagement when there is some working between the sections A and B. The resiliency of the material out of which the ring is formed and the fluid pressure acting on the ring allows for some working of the ring itself, as rotation occurs, so that sealing engagement is at all times maintained both with section A and with section B.

In the form of invention shown in Fig. 6 the various elements may be the same as those hereinabove descibed and the sealing ring may be the same as that hereinabove described. In this form of the invention, however, I provide a means normally yieldingly urging the radial lip 40 into sealing engagement with the end 25 of the core section B to supplement any resiliency of the ring itself and to assure positive contact at all times between the sealing ring and the core. In the case illustrated a simple helical spring 60 is shown provided within the sealing ring. The spring 60 being a simple helical or coil spring has one end fitting or bearing on the inner side 61 of the radial lip of the sealing ring and has the other end bearing on the bottom 17 of section A. The spring 60 is preferably made of such size as to fit within the radial lip 41 with suitable working clearance in which case the spring bears on the outer peripheral portion of lip 40, as clearly illustrated in Fig. 6 of the drawings. The spring 60, like the sealing ring, may be formed of suitable metal and may have such characteristics as to operate in the fluid being handled without discoloration or contamination.

Having described only typical preferred forms and applications of my invention, I do not wish to be limited or restricted to the specific details herein set forth, but wish to reserve to myself any variations or modifications that may appear Having described my invention, I claim:

1. In combination, two tubular sections, one a female section with a socket having a reduced counterbore terminating in an axially facing shoulder, the other section being a male section with a part entering the socket and terminating short of the counterbore and having a flat end opposing the shoulder and spaced therefrom, the counterbore, the shoulder, the inner end portion of the socket, and said end forming an inwardly opening annular chamber, and sealing means confined to said chamber and including a single resilient metal sealing ring having a radially disposed lip substantially coextensive with the said end of the male section, and having an axially facing annular boss on one side adjacent the inner periphery of said lip and bearing on said end, and a tubular lip having one end joined to the outer periphery of the first mentioned lip and projecting therefrom into the counterbore and having sealing engagement in the counterbore, the portion of the ring where the lips join being free of both sections.

2. In combination, two tubular sections, one a female section with a socket having a reduced counterbore terminating in an axially facing shoulder, the other section being a male section with a part entering the socket and terminating short of the counterbore and having a flat end opposing the shoulder and spaced therefrom, the counterbore, the shoulder, the inner end portion of the socket and said end forming an inwardly opening annular chamber, sealing means confined to said chamber and including a single resilient metal sealing ring having a radially disposed lip substantially coextensive with the said end of the male section, and having an axially facing annular boss on one side adjacent the inner periphery of said lip and bearing on said end and a tubular lip having one end joined to the outer periphery of the first mentioned lip and projecting therefrom into the counterbore and having sealing engagement in the counterbore, the portion of the ring where the lips join being free of both sections, and a helical spring under compression between the shoulder and the first mentioned lip and located immediately inside the tubular lip and bearing on the first mentioned lip radially outward of the boss.

ARMAND LYKKE FACCOU.

REFERENCES CITED

The following references are of record in the file of this patent:

UNITED STATES PATENTS

| Number | Name | Date |
|---|---|---|
| 2,111,956 | Baldwin | Mar. 22, 1938 |
| 2,135,223 | Scheiwer | Nov. 1, 1938 |
| 2,233,599 | Gilbert | Mar. 4, 1941 |
| 2,250,348 | Beier | July 22, 1941 |
| 2,305,524 | Frazer-Nash | Dec. 15, 1942 |
| 2,316,059 | Fretter | Apr. 6, 1943 |
| 2,330,197 | Allen et al. | Sept. 28, 1943 |